(12) United States Patent
Mitchell et al.

(10) Patent No.: US 10,555,656 B2
(45) Date of Patent: Feb. 11, 2020

(54) AUTOMATED FLOOR CLEANER

(71) Applicants: Timothy Peter Mitchell, Devon (GB); Alon Gendel, Raanana (IL)

(72) Inventors: Timothy Peter Mitchell, Devon (GB); Alon Gendel, Raanana (IL)

( * ) Notice: Subject to any disclaimer, the term of this patent is extended or adjusted under 35 U.S.C. 154(b) by 164 days.

(21) Appl. No.: 15/580,171

(22) PCT Filed: Jun. 7, 2016

(86) PCT No.: PCT/GB2016/000115
§ 371 (c)(1),
(2) Date: Dec. 6, 2017

(87) PCT Pub. No.: WO2016/198822
PCT Pub. Date: Dec. 15, 2016

(65) Prior Publication Data
US 2018/0140155 A1 May 24, 2018

(30) Foreign Application Priority Data
Jun. 12, 2015 (GB) .................................. 1510373.2

(51) Int. Cl.
A47L 11/40 (2006.01)
A47L 11/30 (2006.01)

(52) U.S. Cl.
CPC ......... *A47L 11/4047* (2013.01); *A47L 11/302* (2013.01); *A47L 11/4011* (2013.01); *A47L 11/4044* (2013.01); *A47L 11/4061* (2013.01); *A47L 11/4066* (2013.01); *A47L 11/4069* (2013.01); *A47L 11/4072* (2013.01); *A47L 11/4083* (2013.01); *A47L 11/4088* (2013.01); *A47L 2201/04* (2013.01)

(58) Field of Classification Search
CPC ............. A47L 11/4047; A47L 11/4066; A47L 11/4069
See application file for complete search history.

(56) References Cited

U.S. PATENT DOCUMENTS

2004/0016077 A1* 1/2004 Song ....................... A47L 9/009
15/319
2005/0166357 A1 8/2005 Uehigashi
(Continued)

FOREIGN PATENT DOCUMENTS

WO 2009132317 A1 10/2009

OTHER PUBLICATIONS

International Search Report for PCT/GB2016/000115 dated Oct. 1, 2016, 6 pages.
(Continued)

*Primary Examiner* — Michael D Jennings
(74) *Attorney, Agent, or Firm* — Klintworth & Rozenblat IP LLP

(57) ABSTRACT

An automated floor cleaner (1) has a cleaner body (2); a cleaning means (3, 45, 6) connected to the cleaner body (2) and configured to in use contact a floor surface to clean the surface; a movement means (7, 19, 8) connected to the cleaner body (2) and configured so that in use the floor cleaner (1) can move across a surface, and; a sensing means 16a, 16b configured to sense the position of the floor cleaner within a location and to transmit data relating to the position to a memory module (20) configured to map and record the position of the floor cleaner (1) during use.

20 Claims, 7 Drawing Sheets

(56) References Cited

U.S. PATENT DOCUMENTS

2005/0209736 A1    9/2005  Kawagoe
2005/0237188 A1*  10/2005  Tani .................... A47L 11/4011
                                                            340/541
2012/0260944 A1   10/2012  Martins, Jr. et al.

OTHER PUBLICATIONS

Written Opinion for PCT/GB2016/000115 dated Oct. 1, 2016, 6 pages.

* cited by examiner

AUTOMATED FLOOR CLEANER

CROSS-REFERENCE TO RELATED APPLICATIONS

This application is a 371 of international PCT/GB2016/000115, filed Jun. 7, 2016, which claims priority to the foreign patent application GB1510373.2, filed on Jun. 12, 2015, the contents of which are incorporated herein in its entirety.

FIELD

The present invention relates to an automated floor cleaner. More particularly, the present invention relates to an automated floor cleaner for hospital floors or similar structures where high standards of cleanliness and hygiene are required.

BACKGROUND

Floor cleanliness and hygiene is a high priority in buildings and locations such as hospitals, where regularly scheduled cleaning is required in order to prevent the build-up of bacteria and other harmful matter and organisms. Floor cleaning will generally be carried out using a manually-operated scrubber dryer or a similar device, to a pre-set schedule. For example, certain rooms, corridors and similar areas with high footfall and throughput could be scheduled for cleaning daily or twice-daily, with an operator checking the schedule, moving to the area scheduled for cleaning, and manually moving/directing a scrubber dryer over the floor within the area in order to clean it. Other areas could be scheduled for weekly cleaning, or be subject to a regular but less-frequent cleaning cycle.

Due to the manual nature of the cleaning operation where a user-operated machine such as a scrubber dryer is used, mistakes and omissions can occur. If a scrubber dryer is moved manually within or through a set or known location such as a room or corridor, the operator can easily overlook certain areas of the floor as they move through the location, or can fail to clean areas within the location as thoroughly as is required, failing to pass over or dwell on certain areas for the length of time required for thorough cleaning to take place. This problem may be exacerbated if certain areas are harder to access due to hospital equipment or other similar items being located within an area on a temporary or more long-term basis. An operator has to work around these items during a cleaning operation, and will potentially missing areas that require cleaning, that are blocked or shielded by the presence of this equipment.

Automatic cleaners are also known, which move under their own power, and which are programmed to carry out automated cleaning routines within a location.

Cleaners of this type are usually programmed with a generalised set of instructions, such as moving outwards in a spiral from a non-specific starting point, or commencing a cleaning operation by moving from a non-specific starting point and following a set pattern until encountering an obstacle such as a wall, followed by a semi-set or generalised pattern intended to cover enough of the floor area to reach a reasonable standard. Due to the generalised nature of the instruction set, and the lack of pattern recordal, it can be difficult to assess whether cleaning has taken place to a required standard across the entirety of the location, and it can be difficult to know if further cleaning is required, and when to schedule this.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY

It is an object of the present invention to provide an automated floor cleaner which goes some way to overcoming the abovementioned disadvantages or which at least provides the public or industry with a useful choice.

It is a further object of the invention to provide a cleaning brush for an automated floor cleaner which goes some way to overcoming the abovementioned disadvantages or which at least provides the public or industry with a useful choice.

It is a yet still further object of the invention to provide a method of cleaning which goes some way to overcoming the abovementioned disadvantages or which at least provides the public or industry with a useful choice.

The term "comprising" as used in this specification and indicative independent claims means "consisting at least in part of". When interpreting each statement in this specification and indicative independent claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

Accordingly, in a first aspect the present invention may broadly be said to consist in an automated floor cleaner, comprising: a cleaner body; a cleaning means connected to the cleaner body and configured to in use contact a floor surface to clean the surface; a movement means connected to the cleaner body and configured so that in use the floor cleaner can move across a surface, and; a sensing means configured to sense the position of the floor cleaner within a location and to transmit data relating to the position to a memory module configured to map and record the position of the floor cleaner during use. The sensing means and memory module allow data relating to the cleaning cycle to be collected and if necessary checked so as to ensure that thorough cleaning has taken place at designated intervals.

In an embodiment, the cleaning means comprises an endless belt, extending from the cleaner body so that in use a section of the surface area of the belt is in contact with the floor, the cleaning means further comprising a motor, connected to the belt to drive the belt independently of movement of the floor cleaner across the floor. An endless belt has been found to be advantageous in helping to provide cleaning to the required standard.

In an embodiment, the belt comprises a plurality of bristles that extend outwards from the main body of the belt. The bristles assist with thorough cleaning.

In an embodiment, the bristles are spaced across the width of the belt. This helps to ensure that cleaning takes place at all required locations.

In an embodiment, the bristles are substantially regularly spaced across the width of the belt in rows, the number of bristles in each row substantially between 50 and 60. This has been found to assist with the provision of thorough cleaning.

In an embodiment, the rows are formed in groups of six rows with a discrete gap between each group. This has been found to assist with the provision of thorough cleaning.

In an embodiment, the rows in each group are spaced substantially 10 mm apart. This has been found to provide thorough cleaning.

In an embodiment, the discrete gap between each group is substantially 15 mm. This provides a structure that can easily be formed and used, and which will provide thorough cleaning.

In an embodiment, each bristle is substantially circular in cross-section with a diameter of substantially 2 mm. This provides a structure that can easily be formed and used, and which will provide thorough cleaning.

In an embodiment, substantially the lower half of each bristle is angled rearwards. This assists the bristles with cleaning and also with movement of the belt without undue force or strain on the bristles.

In an embodiment, the angle is substantially 45 degrees. This assists the bristles with cleaning and also with movement of the belt without undue force or strain on the bristles.

In an embodiment, the belt has a width substantially between 250 mm and 450 mm. This has been found to provide a width that allows efficient cleaning of an area such as a room.

In an embodiment, the main body of the belt has a thickness of substantially between 5 mm and 12 mm. This has been found to provide a belt that is, robust and reliable.

In an embodiment, the belt is arranged to in use extend from the cleaner body so that the section of the surface area of the belt in contact with the floor comprises substantially between ⅓ and ½ of the total outer surface area of the belt. This allows the belt to rotate effectively and to clean thoroughly.

In an embodiment, the cleaning means further comprises at least two rollers, the rollers and belt arranged so that the belt passes over the rollers and is held in tension. This provides an effective way of driving the belt.

In an embodiment, the cleaning means comprises three rollers, the rollers arranged so that the belt passes over the rollers in a triangular pattern. This provides an effective way of driving the belt.

In an embodiment, the triangular pattern is a substantially equilateral triangle. This provides an effective way of driving the belt.

In an embodiment, the cleaning means further comprises at least one fluid jet connected to the cleaner body and configured to direct a spray of fluid onto the raised external surface of the belt. This provides a cleaning wash to the area scrubbed by the belt and helps to optimise the effectiveness of the cleaning.

In an embodiment, the at least one fluid jet is arranged so that the fluid therefrom will be directed onto the raised external surface of the belt just prior to that section of the surface area of the belt moving into contact with the floor surface. This helps to optimise the effectiveness of the cleaning.

In an embodiment, the automated floor cleaner further comprises a tank configured to hold a volume of fluid and a pump, the tank and the at least one fluid jet fluidically connected, the pump configured to drive a flow of fluid from the tank to the at least one fluid jet. This allows the cleaner to be self-contained and operate autonomously.

In an embodiment, the automated floor cleaner further comprises a vacuum pump, connected to the cleaner body and configured to provide suction force to the raised external surface of the belt. This allows excess fluid and particulates to be removed from the cleaning area.

In an embodiment, the vacuum pump is located so that suction force is directed onto the belt just after that section of the surface area of the belt moves out of contact with the floor surface. This helps to ensure the effective removal of excess fluid and particulates from the cleaning area.

In an embodiment, the automated floor cleaner further comprises at least one filter, the vacuum pump directing air and water sucked from the belt into and through the filter. This helps to remove particles and similar from the area undergoing cleaning.

In an embodiment, the at least one filter comprises a UV filter configured to direct UV light into and through the air and water sucked from the belt. This assists with sterilisation and disinfecting of the area.

In an embodiment, the at least one filter further comprises a particulate filter located so as to filter the air and water stream before this reaches the UV filter. This helps to remove particles and similar from the area undergoing cleaning.

In an embodiment, the particulate filter has a rating of substantially 5 microns and above. This helps to ensure the provision of thorough cleaning.

In an embodiment, the particulate filter is at least one carbonate sponge filter. This type of filter has been found to provide a greater surface area for trapping particles within the gases/liquid stream.

In an embodiment, the air and water stream from the belt is directed back to the water tank. This helps to provide greater efficiency, and allows the cleaner to use a significantly reduced volume of water for a particular size of surface area to be cleaned, allowing the cleaner to be smaller and more compact in size and to carry less water in order to clean an area.

In an embodiment, the automated floor cleaner further comprises a sponge, located so as to cover the front belt face. This assists with cleaning and wetting of the belt just prior to that part of the belt being brought into contact with a surface for cleaning.

In an embodiment, the movement means comprises at least one drive wheel and at least one drive motor connected to the cleaner body and configured to move the floor cleaner across a surface. This provides a simple and effective mechanism for movement.

In an embodiment, the movement means comprises a pair of drive wheels mounted at or towards the front of the cleaner body on or towards opposed sides of the cleaner body. This provides a simple and effective mechanism for movement.

In an embodiment, the movement means further comprises at least one caster wheel mounted to support and allow the cleaner body to move. This provides a simple and effective mechanism for movement.

In an embodiment, the sensing means comprises at least one short range sensor configured to sense the proximity of the automated floor cleaner to a wall to the front of the automated floor cleaner. This allows the cleaner to move autonomously and sense it's location relative to it's surroundings.

In an embodiment, the at least one short range sensor comprises an infra-red sensor. These are effective and robust sensors.

In an embodiment, the sensing means further comprises at least one long range sensor configured to sense the proximity of the automated floor cleaner to a wall to the front of the automated floor cleaner. This allows the cleaner to move autonomously and sense it's location relative to it's surroundings.

In an embodiment, the at least one long-range sensor comprises an infra-red sensor.

These are effective and robust sensors.

In an embodiment, the memory module comprises at least in part a control processor integral to the automated floor cleaner, the processor configured to receive data from the sensing means and the movement means and to calculate the position of the automated floor cleaner therefrom. This allows the cleaner to operate autonomously.

In an embodiment, the control processor is further configured to calculate data relating to one or more of: linear and square meters covered during a cleaning operation; the time taken; water and chemical/cleaner usage during the cleaning operation, and; time and date information. This allows the cleaner to operate autonomously and to record data relating to a cleaning process.

In an embodiment, the automated floor further comprises a wireless transmitter configured to transmit the data to a remote server. This allows the cleaner to upload data to a server for review.

In an embodiment, the automated floor further comprises an RFID reader configured to read data stored on tags located within or close to the area of operation of the automated floor cleaner, the wireless transmitter configured to transmit the RFID data as read to the remote server. This allows the cleaner to upload information relating to a particular area to be cleaned prior to cleaning.

In an embodiment, the cleaning means comprises or further comprises an ultra-violet lamp mounted on the cleaner body and aligned so that the light from the ultraviolet lamp shines onto the floor. This assists with the cleaning and disinfecting of an area to be cleaned.

In a second aspect the invention may broadly be said to consist in an endless belt for a floor cleaner, comprising: a flexible body formed as a continuous loop so as to have inner and outer faces; a plurality of bristles extending outwards from the outer face and spaced across the width of the belt body in a plurality of rows. This provides a robust and effective structure for an automated cleaner.

In an embodiment, the bristles are integrally formed with the body. This provides a robust and effective structure for an automated cleaner and helps to provide effective cleaning in use.

In an embodiment, the number of bristles in each row is substantially between 50 and 60. This has been found to assist with the provision of thorough cleaning.

In an embodiment, the rows are formed in groups of six rows with a discrete gap between each group. This has been found to assist with the provision of thorough cleaning.

In an embodiment, the rows in each group are spaced substantially 10 mm apart. This has been found to provide thorough cleaning.

In an embodiment, the discrete gap between each group is substantially 15 mm. This provides a structure that can easily be formed and used, and which will provide thorough cleaning.

In an embodiment, each bristle is substantially circular in cross-section with a diameter of substantially 2 mm. This provides a structure that can easily be formed and used, and which will provide thorough cleaning.

In an embodiment, substantially the lower half of each bristle is angled rearwards. This assists the bristles with cleaning and also with movement of the belt without undue force or strain on the bristles.

In an embodiment, the angle is substantially 45 degrees. This assists the bristles with cleaning and also with movement of the belt without undue force or strain on the bristles.

In an embodiment, the belt has a width substantially between 250 mm and 450 mm.

This has been found to provide a width that allows efficient cleaning of an area such as a room.

In an embodiment, the main body of the belt has a thickness of substantially between 5 mm and 12 mm. This has been found to provide a belt that is robust and reliable.

In a third aspect the invention may broadly be said to consist in a method of cleaning a floor surface using an automated floor cleaner by setting the floor cleaner to carry out the steps of:

(i) moving in a straight line in a first direction until reaching an obstacle;

(ii) turning on reaching the obstacle to travel to the left and then move in a subsequent straight line in a second direction opposite to the first direction and overlapping with the previous path;

(iii) moving in the second direction until reaching an obstacle;

(iv) assessing whether the lower left-hand corner of the area to be cleaned has been reached;

(v) if the lower left-hand corner has been reached then finishing the cleaning operation, otherwise turning so as to travel to the left and then move in a subsequent straight line in the first direction overlapping with the previous path until reaching an obstacle. This method provides a simple set of instructions for a cleaner that allows the cleaner to thoroughly clean an area and where operator involvement can also be kept minimal.

In an embodiment, the method of cleaning a floor surface comprises the further step between steps (iii) and (iv) of assessing whether any subsequent straight line is shorter than the previous straight line, and if shorter, continuing to turn and move to the left to create parallel overlapping shorter straight lines until a longer straight line is created, then to make turns from the end of this longer straight line to travel to the right until a previously cleaned section or right-hand wall is reached. This method provides a simple set of instructions for a cleaner that allows the cleaner to thoroughly clean an area and where operator involvement can also be kept minimal, and where obstacles within a room can also be accounted for.

In an embodiment, the method of cleaning a floor surface comprises the further step between steps (iii) and (iv) of assessing whether any subsequent straight line is longer than the previous straight line, and if longer, turning and moving to the right at the end of the longer line to create parallel overlapping shorter straight lines until a right-hand obstacle or a previously-cleaned section is reached, then to make turns from the end of this longer straight line to travel to the right until a previously cleaned section or right-hand wall is reached. This method provides a simple set of instructions for a cleaner that allows the cleaner to thoroughly clean an area and where operator involvement can also be kept minimal, and where obstacles within a room can also be accounted for.

In an embodiment, the further step(s) also comprise the sub-step(s) of moving directly to the left on reaching the top end of the right-hand obstacle or previously-cleaned section until the left-hand side of the last-created long straight line is reached, then turning and resuming cleaning. This method provides a simple set of instructions for a cleaner that allows the cleaner to thoroughly clean an area and where operator involvement can also be kept minimal, and where obstacles within a room can also be accounted for.

With respect to the above description then, it is to be realised that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE FIGURES

Further aspects of the invention will become apparent from the following description which is given by way of example only and with reference to the accompanying drawings which show an embodiment of the device by way of example, and in which.

DETAILED DESCRIPTION

Embodiments of the invention, and variations thereof, will now be described in detail with reference to the figures.

Figure 1:
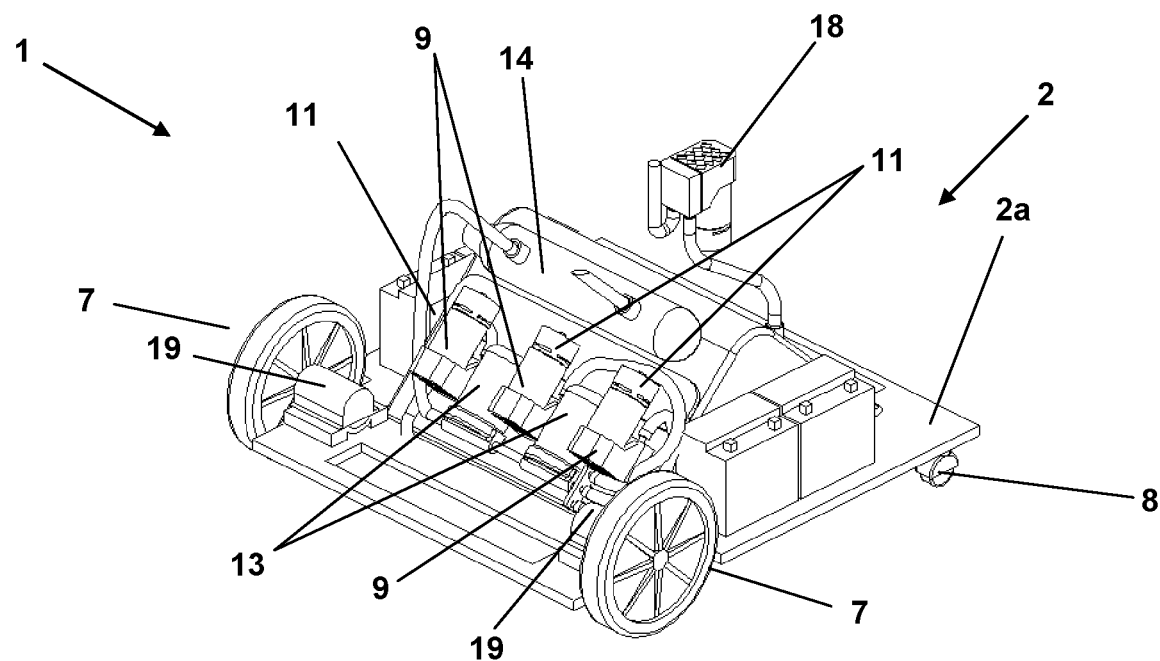
FIG. 1 shows a perspective view of an embodiment of the automated floor cleaner of the present invention, the floor cleaner shown without an external casing or cover present in order to show detail of a cleaner body on which are mounted front wheels and rear casters that allow the cleaner body to move across a surface, an endless belt extending from the cleaner body with a lower section of the surface area of the belt in contact with the floor, the belt driven by a motor connected to the belt to drive the belt independently of movement of the floor cleaner across the floor, the belt mounted on three rollers so that from the side the perimeter or edge has the appearance of an equilateral triangle when viewed from the side, fluid jets located on the body to direct a spray of fluid onto the raised external surface of the belt just prior to that section of the surface area of the belt moving into contact with the floor surface, a fluid tank and a pump mounted on the body to drive a flow of fluid from the tank to the fluid jets, a vacuum pump mounted to the body to apply suction force onto the belt just after that section of the surface area of the belt moves out of contact with the floor surface, the air and water mixture that is sucked off the belt directed into and through a particulate filter and a UV filter before being directed back to the tank.

An embodiment of automated floor cleaner or cleaning robot 1 is shown in FIG. 1. The automated floor cleaner has a cleaner body 2 on which a number of individual elements are mounted, as detailed below. The elements mounted on the body can be broadly divided into three main sub-groups: cleaning elements; movement elements, and; sensing elements. The cleaning robot 1 also contains an integral processor 20 that controls the operations of the cleaning robot 1 (sending commands to the cleaning and movement elements, and receiving feedback and data back from these), and which also receives input from the sensing elements, and external commands from operators or similar.

Movement Elements

The cleaner body 2 appears rectangular from above, and has a chassis 2a that forms the main part of the cleaner body, and a cover or casing 2b that is mounted to the chassis 2a and which covers and protects the other elements mounted thereon. The sides of the cover are angled inwards so that the automated floor cleaner 1 appears pyramid-shaped. A pair of drive wheels 7 are mounted to the chassis 2a at the front of the cleaner body 2, at or close to the front corners. Each of the pair of drive wheels 7 is powered by an electric motor 19 (one motor 19 for each of the wheels 7) that is mounted in the cleaner body 2, next to the wheel 7 that it drives. The motors 19 can be driven independently so as to allow the floor cleaner 1 to turn and/or corner.

A pair of caster wheels 8 are mounted at or close to the rear corners of the cleaner body 2. These are undriven, but can rotate freely to allow the floor cleaner 1 to turn and move freely. In this embodiment, a pair of 30 mm caster wheels are used, but a single wheel could also be used in place of the pair, and these could be of any suitable size, for example any size in the range between 25 mm and 75 mm.

Cleaning Elements

In use, as the automated floor cleaner 1 moves across a floor surface, the cleaning elements clean the floor surface underneath the automated floor cleaner 1. The main cleaning element is an endless belt 3. In this embodiment, the endless belt 3 is formed from rubber, and has a smooth inner surface, and bristles 5 formed integrally with the outer surface, which scrub the floor as the belt moves over the floor. The endless belt 3 and bristles 5 will be described in detail below. The endless belt 3 is mounted on the cleaner body 2 via three rollers 4, the belt 3 passing over the rollers 4. The rollers 4 are arranged so that when viewed from the side (perpendicular to the direction of travel of the belt) the belt appears as an equilateral triangle, with rounded corner where the belt passes over the rollers. One roller is located at the apex, and the other two form the lower corners. The outer surface of that section of the belt between the two lower rollers is in contact with the floor surface—that is, around ⅓ of the total outer surface area of the belt is in contact with the floor surface at any one time. The belt 3 continually passes over the rollers 4 in use so that the outer surface of the belt moves across and scrubs the floor. In this embodiment, a motor 6 is mounted between the rollers 4 (inside the triangle of the belt 3) and drives at least one of the rollers to move the belt 3. The upright sides of the triangle form a front belt face and a rear belt face. The belt moves so that that portion of the belt at the front (the front belt face) moves downwards and under the cleaner body 2.

A sponge 17 is mounted so as to be in contact with the front belt face. As the belt moves, the sponge wipes the belt, the sponge 17 remaining stationary.

Fluid atomiser or fluid jets 9 are mounted on the cleaner body 2 at the front of the cleaner body 2. In this embodiment, there are multiple fluid jets arrayed across the front belt face. Depending on the particular variation, up to fifteen or more individual jets could be used. However, a single jet could also be used. The jet or jets face rearwards and downwards to direct a spray of fluid towards the front belt face so as to soak the sponge 17, which in turn wets the belt 3. The fluid jet or jets 9 in this embodiment can spray between 500 ml and 1,500 ml per hour, depending on the cleaning requirement. The fluid jets 9 are fluidically connected to and fed from a tank 10 that is also mounted on the cleaner body 2. The tank 10 holds a volume of fluid such as a cleaning fluid or water. The tank 10 can be replenished and refilled via a top filling aperture that in use is closed by a cap 15. A cleaner pump 11 drives the flow of water from the tank 10 to the jets 9.

A vacuum pump 12 is mounted on the cleaner body 2 at the rear side of the belt 3, so as to provide a suction force onto the raised external surface of the belt 3 just after that section of the external surface area of the belt 3 moves out of contact with the floor surface, the suction force pulling fluids and particles off the belt. The mixture of air, water and particles pulled off the belt is directed through a particulate filter 13 behind or downstream of the vacuum pump 12. The particulate filter 13 removes particles from the air and water stream, and in this embodiment has a rating of five microns or above. In a preferred variant, the filter 13 is a carbonate sponge filter or filters. These have been found to provide a greater surface area for trapping particles within the gases/liquid stream.

The stream is then passed through a UV filter 14, which directs UV light through the stream to kill bacteria and other pathogens. Once the stream has passed through the UV filter, it is directed back to the tank 10 via a secondary assistance pump 18.

Endless Belt

As outlined above, the endless belt 3 is one of the main cleaning elements. In variations of this embodiment, the belt 3 has a width of between 250 mm and 450 mm, and an overall length of 730 to 780 mm. However, in most variations, it is likely that the belt will have a width of between 270 mm and 300 mm.

The belt 3 is formed from rubber, the bristles 5 extending from one side of the main continuous body of the belt 3. In this embodiment, the bristles 5 are formed integrally with the main body of the belt 3. The main continuous body of the belt 3 has a standard cross-sectional depth or thickness at any particular point. Ideally, the depth of the main continuous body of the belt 3 is between 5 mm and 12 mm (that is, the belt 3 has e.g. a depth of 5 mm at all points along the body, or a thickness of 12 mm at all points along the body, or any dimension therebetween). The inner side of the belt 3 is smooth so as to pass easily over the rollers 4. The bristles 5 are integrally formed as part of the belt 3 and extend from the other, or outer, side.

The bristles 5 are spaced across the width of the belt 3, substantially regularly across the width of the belt, and are arranged in rows perpendicularly across the width of the belt 3. The number of bristles 5 in each row is between 50 and 60. The rows are formed in groups of six rows, each row spaced approximately 10 mm from it's immediate neighbour (s) in the group, with a discrete gap between each group of approximately 15 mm.

Each bristle 5 is substantially circular in cross-section, with a diameter of substantially 2 mm. The lower half of each bristle is angled rearwards (that is, away from the direction of travel) at an angle of approximately 45 degrees.

In use, in this embodiment, the motor 6 drives the belt 3 at a speed of between 50 and 150 rpm.

Sensing Elements

Figure 2:
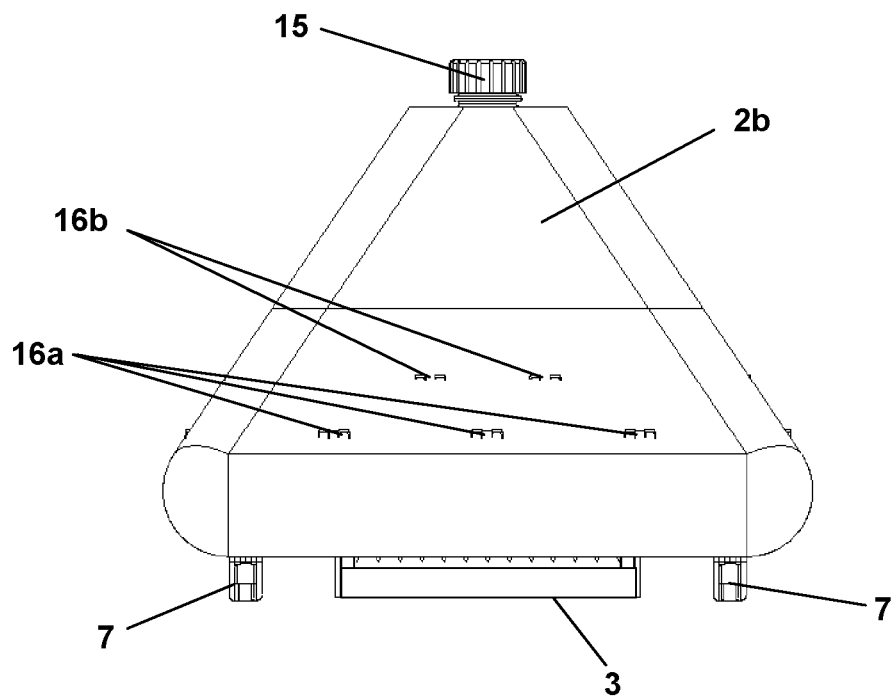
FIG. 2 shows a front view of the floor cleaner of FIG. 1, with an external casing present and covering and enclosing the upper part of the automated floor cleaner, the figure showing detail of the lower section of the endless belt that is located to extend from under the body of the cleaner, and detail of a number of infrared proximity sensors which extend from the casing.
Figure 3:
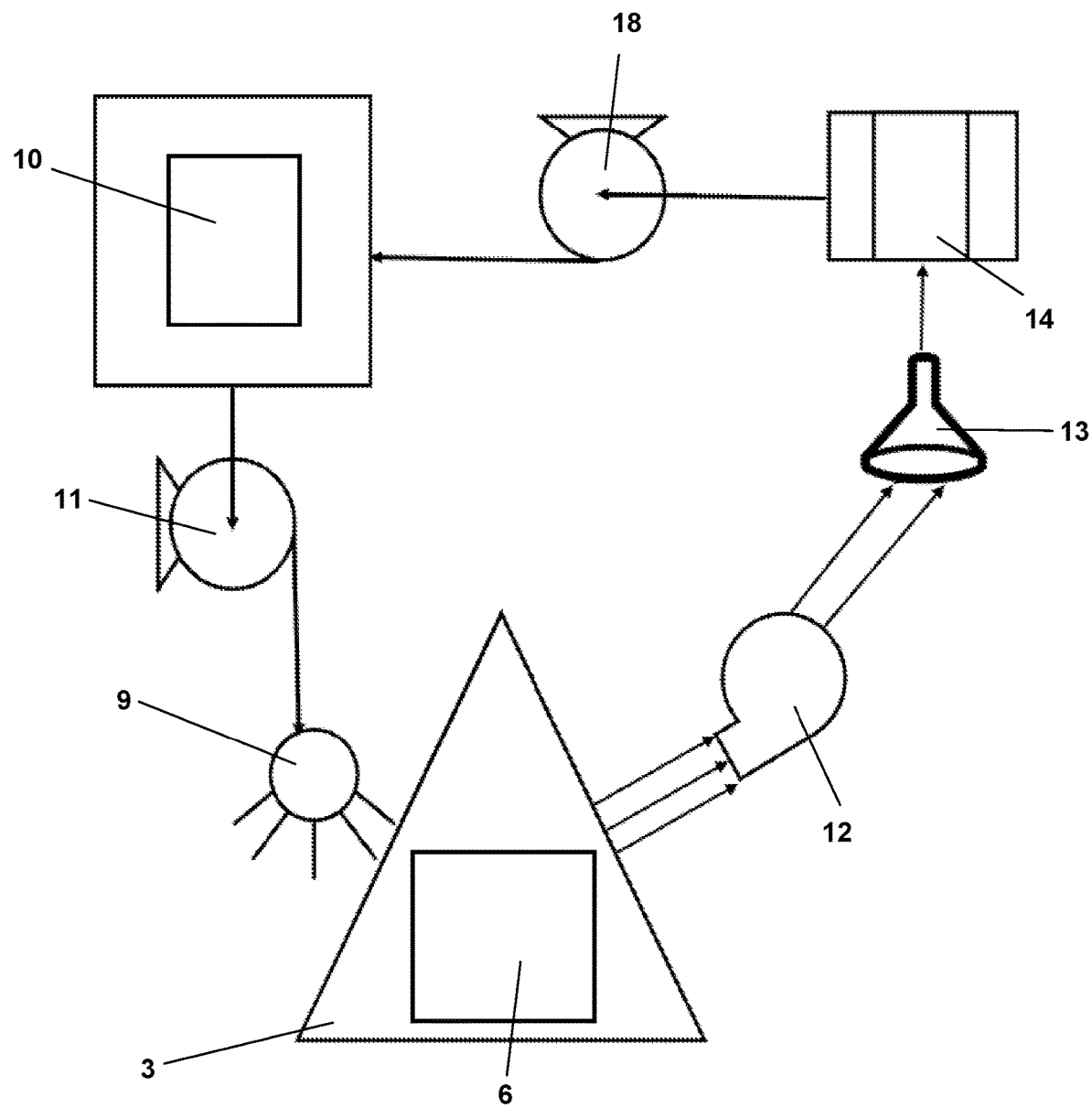
FIG. 3 shows a schematic view of the elements that form part of the floor cleaner of FIGS. 1 and 2, that are located within the casing, the endless belt driven by a motor, with water or other fluid directed onto the front side of the belt via the jets, the water/fluid pumped to the jets from a tank via a pump, particles and water sucked from the belt at the rear side by a vacuum pump, the water/air stream passing through a particulate filter and a UV filter before being passed back to the water tank via a secondary or assistance pump.
Figure 4:
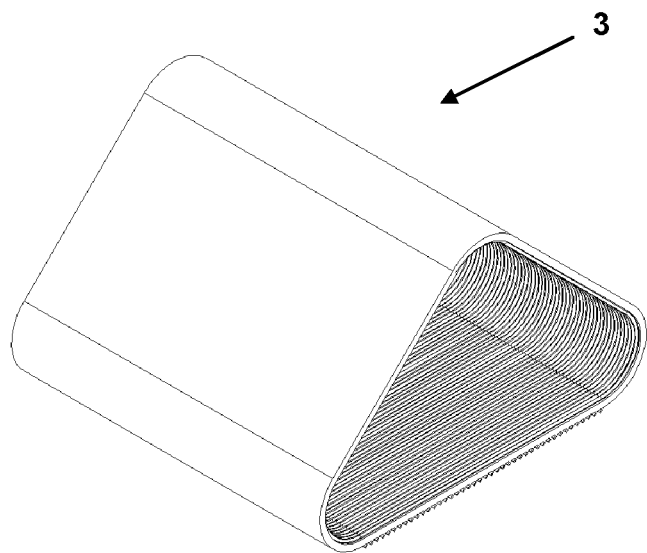
FIG. 4 shows a perspective view from the front and to one side of the endless belt used as part of the cleaner of the embodiment of the invention shown in FIGS. 1 and 2, the belt shown aligned as it would be for use as part of the cleaner, and shaped so that the perimeter or edge has the appearance of an equilateral triangle when viewed from the side, with the lower or base face horizontal in order to contact a floor surface, the remainder of the belt forming a front belt face and a rear belt face that extend upwards from the front and rear corners respectively, to the triangle apex.
Figure 5:
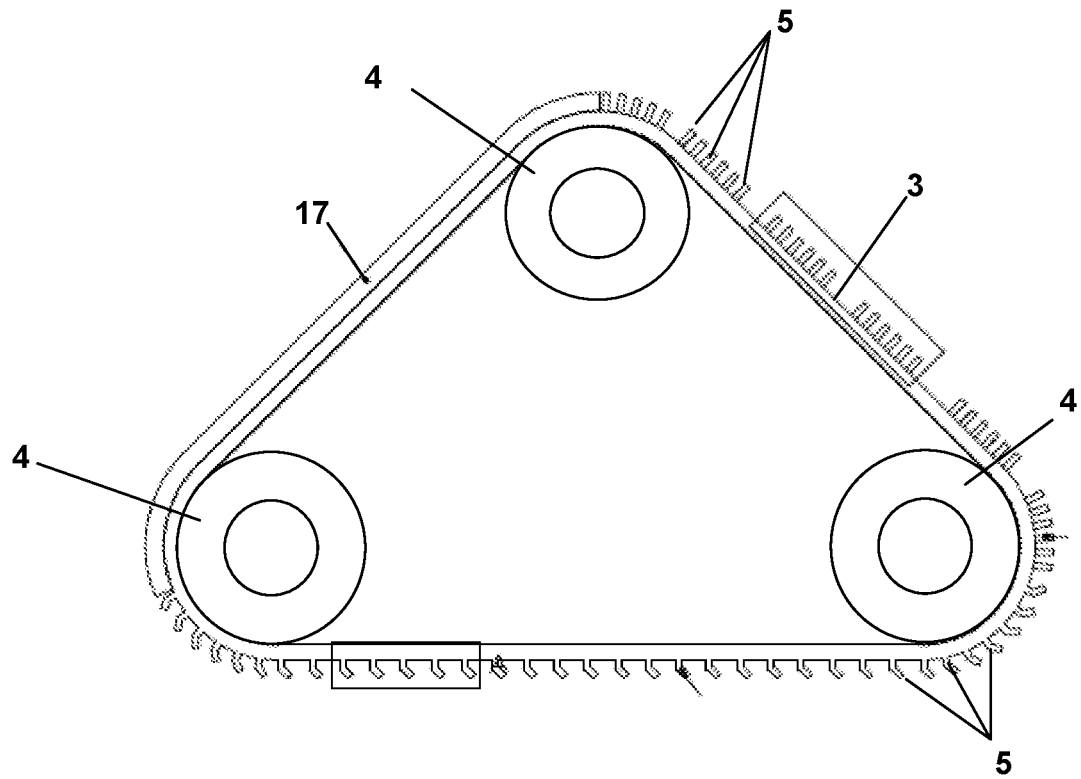
FIG. 5 shows a side view of the belt of FIG. 4, showing detail of the bristles, which are formed in groups of six rows across the width of the belt, and which have an outer portion or half angled rearwards at 45 degrees, a high-density sponge covering the front belt face.
Figure 6:
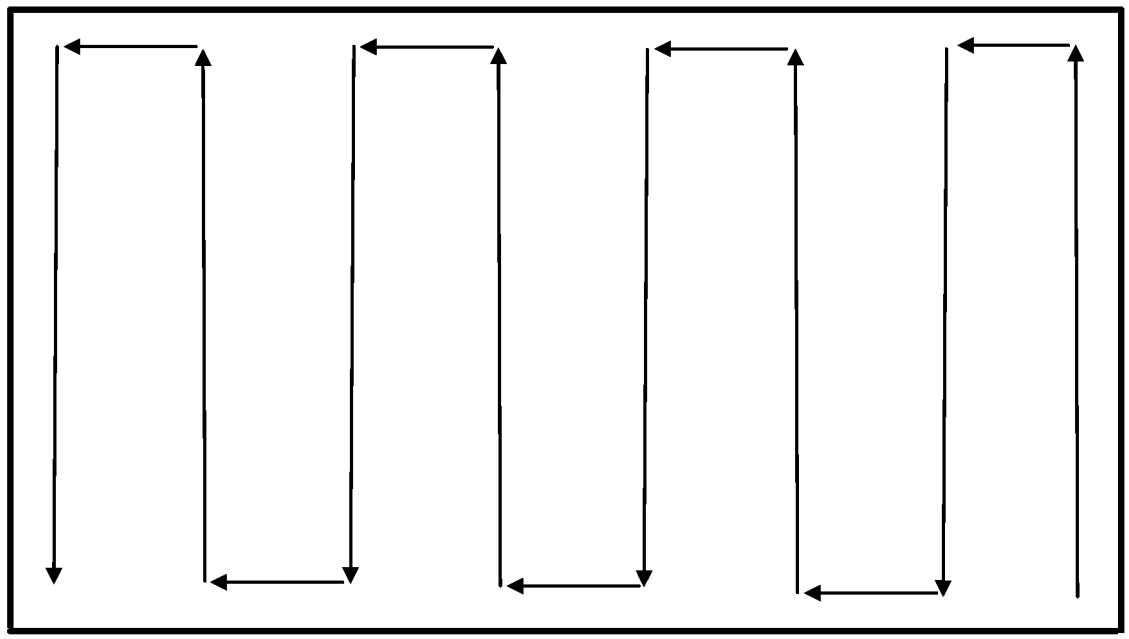
FIG. 6 shows a schematic example of the path the floor cleaner of FIGS. 1 to 5 will take in use across an empty room, the room shown in plan view.

A number of sensors 16 are mounted on the cleaner body 2, and as shown in FIG. 2 extend through the front of the cover 2b. The sensors 16 are a mix of short-range sensors 16a and long range sensors 16b. In the embodiment shown and described, they are infra-red sensors configured to sense the position of the floor cleaner 1 within a location and to transmit data relating to the position to a memory module configured to map and record the position of the floor cleaner during use.

Additional Elements and Variants

An RFID reader 22 is also included as part of the floor cleaner 1 of this embodiment. The RFID reader is configured to read data from RFID tags close to the floor cleaner. The floor cleaner 1 also includes a wireless transmitter 23 that transmits the data received from the RFID tags to a cloud-based server, along with associated time and date information, and any other information as necessary—for example linear and square meters covered during any particular cleaning operation, the time taken, and water and chemical/cleaner usage during the cleaning operation.

In some embodiments, a UV lamp 21 can be mounted on the chassis 2*a*, aligned so that the light from the UV lamp shines onto the floor. The UV light from the lamp assists with sterilisation of the floor surface as it is cleaned.

A number of variations of the elements described above could also be used, instead of or as well as those described. For example, the sensors could be ultrasonic rather than infra-red, and GPS could be used instead of or as well as the proximity sensors.

The belt of the embodiment described above is generally arranged as an equilateral triangular shape in side view. The belt could be arranged in other suitable shapes. For example, the belt could be arranged as a right-angle or non-regular triangle shape, or with a top portion parallel to the lower or underside portion that is in contact with and extending along the floor surface, with the ends looped over a main pair of rollers—a front and rear roller. That is, the shape made by the belt would appear generally rectangular in side view, with rounded or semi-circular ends.

Operation

In this embodiment, during operation the motor 6 drives the belt 3 at a speed of between 50 and 150 rpm. As noted above, the fluid jet or jets 9 spray between 500 ml and 1,500 ml per hour.

Operation of the floor cleaner 1 within a room, hall or other bounded or discrete area to be cleaned is as follows:

An operator transports the floor cleaner 1 to an area to be cleaned, such as a room or a hall. Entry of the cleaner into the room is recorded via communication/transmission between RFID tags that have been pre-located in the room, and the RFID reader in the floor cleaner 1. Each of the RFID tags serves to uniquely identify the particular area. This is communicated to the floor cleaner 1 on interrogation by the RFID reader. Other information about the location can also be included in the RFID tag as required. The location information is transmitted from the floor cleaner 1 to a cloud-based server, along with time/date of operation information, and other specific cleaning information as detailed below.

Figure 9:
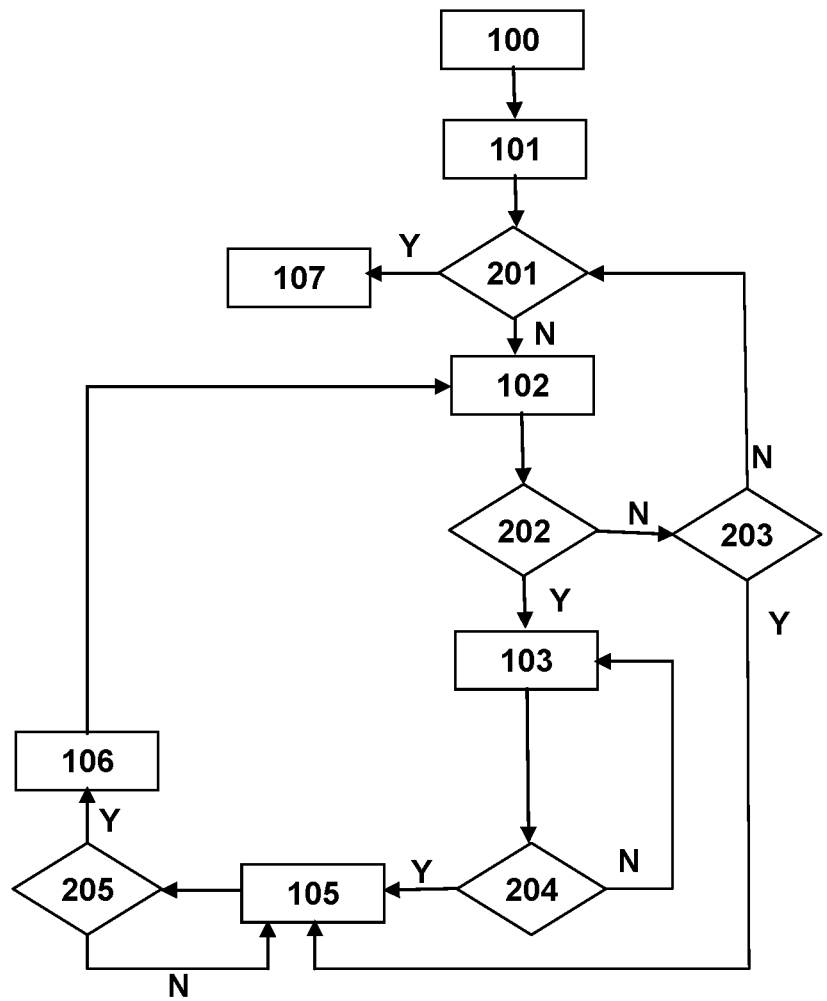
FIG. 9 shows a flow chart of the cleaning process.

The relative directional or positional information in the following portion of the description in relation to the operation of the floor cleaner 1 should be read as if viewing a regular, rectangular room in plan view. These should not be read as directional or turn indications for the cleaning robot 1 in use, and only as direction indicators relative to the rectangular room in plan view. A flow chart showing the general cleaning process and decision points is shown in FIG. 9. The operator locates the floor cleaner 1 at the lower-right-hand corner of the room (viewed in plan view), with the floor cleaner 1 aligned so as to travel directly in parallel with the right-hand wall (that is, vertically upwards when viewed in plan view). The floor cleaner 1 is then set in operation. As a first step (step 100 in FIG. 9), the cleaning robot 1 will read the RFID data from the RFID tag in the room. Once this is completed, the robot will start a cleaning operation (step 101), the cleaning robot 1 moving from the initial position in the lower-right corner to travel along the floor, in parallel with the wall to it's right (upwards in plan view). As the floor cleaner 1 moves, the belt 3 rotates to scrub the floor, the fluid jets 9 spraying the front face of the belt, the floor cleaner 1 creating a cleaned track along the right-hand wall, in parallel with the wall. The floor cleaner 1 will continue to travel in this direction until the sensors 16 sense that it is approaching a wall or other obstacle—for example, the far wall of the room, which for a rectangular room viewed in plan view is the wall that forms the horizontal top edge of the room. The floor cleaner 1 is programmed to slow down as it approaches this wall. At the point at which the floor cleaner 1 reaches this far wall, it will stop in place. The floor cleaner 1 will stop as close in to the far wall as it can, while still being able to manoeuvre in place, with this distance measured by the sensors 16, which feed information back to the central processor 20 so that the central processor 20 can assess the distance and relative positions of the floor cleaner 1 and the wall in front of it. At the point where the central processor 20 judges that the floor cleaner 1 is close enough to the wall, the central processor 20 will command the floor cleaner 1 to carry out a zero-point turn, or turn/rotate in place, to it's left, or anti-clockwise. That is, the turn takes place about a vertical axis that generally passes through the apex of the pyramid formed by the casing 2*b*. The floor cleaner 1 turns anti-clockwise (viewed in plan) until it is aligned so as to move parallel to the far or top wall, to the left. At this point, the cleaning robot will assess whether it has reached the far-left wall of the room (decision box 201). If it has not reached the far-left wall, the floor cleaner 1 will then move forward (to the left on the plan view) until it can make another anti-clockwise zero-point turn to face back the way it came, or downwards on the plan view, in such a position that when it moves back the way it came, it's cleaning track will overlap with the previously created initial cleaning track along the right-hand wall by approximately 2-3 cm. The turns and movement necessary for the robot to position itself at the start of this second parallel return track are represented by box 102 in FIG. 9. In this instance, box 102 represents a turn at the top edge through 180 degrees to starts a downwards track. However, in FIG. 9, box 102 represents a turn at either end of 180 degrees to face in the opposite direction. That is, either to turn at the bottom through 180 degrees to face upwards, or to turn at the top through 180 degrees to face downwards, and to start moving and cleaning in a straight line. These will be the opposite from each other at each side of the room, so that the cleaning robot 1 is always moving to the left unless it needs to clean around obstacles, as described below.

The processor 20 then instructs the floor cleaner 1 to move forward, and the floor cleaner 1 then moves back towards the lower edge or wall along a path next to the initial or first-created track, the cleaning path the floor cleaner 1 creates on this path overlapping with the initially created path. The cleaning robot will also assess whether this return track is shorter than the previous track (decision box 202). If not shorter, it will move on the assess whether it is longer (decision box 203). In this example, the room is empty, so the tracks are the same length. Therefore, on reaching the lower edge or wall, the floor cleaner 1 performs another zero-point turn to it's right, or clockwise through 90 degrees, until it can move parallel with the lower edge or wall. The floor cleaner 1 then moves forwards a short distance and makes another right-hand/clockwise turn so that it is facing in the same direction as it was initially facing, back towards the top edge or wall, with the track that it is about to create again overlapping the parallel adjacent track by 2-3 cm.

The floor cleaner 1 will continue to operate in this manner, moving up and down/across the room to create a series of cleaned strips or tracks in parallel to one another and parallel to the side walls, until it reaches the left-hand wall. That is, when it turns at either the top or the bottom wall, it can move no further to the left, or can only move a shorter distance than it would normally when moving to the left. The As the left-hand wall has been reached, the cleaning robot will move to the lower-left corner (plan view), either by completing it's final track upwards along the left-hand wall, or downwards. Once this final track is completed, if it is not already in the lower-left corner (it ends the track in the upper-left corner), it will turn around on it's axis and move to the lower-left corner. At this point it will transmit information relating to the cleaning process, including linear and square meters covered (as calculated by the central processor 20 from the speed//time/distance traveled as assessed from feedback from the motor(s) 19), the total time taken, and water and chemical usage. The floor cleaner 1 will then deactivate. This final step of assessing that the left-hand wall has been reached, and moving to the lower-left corner, is represented by the 'yes' decision from box 201, and box 107.

Figure 7A:
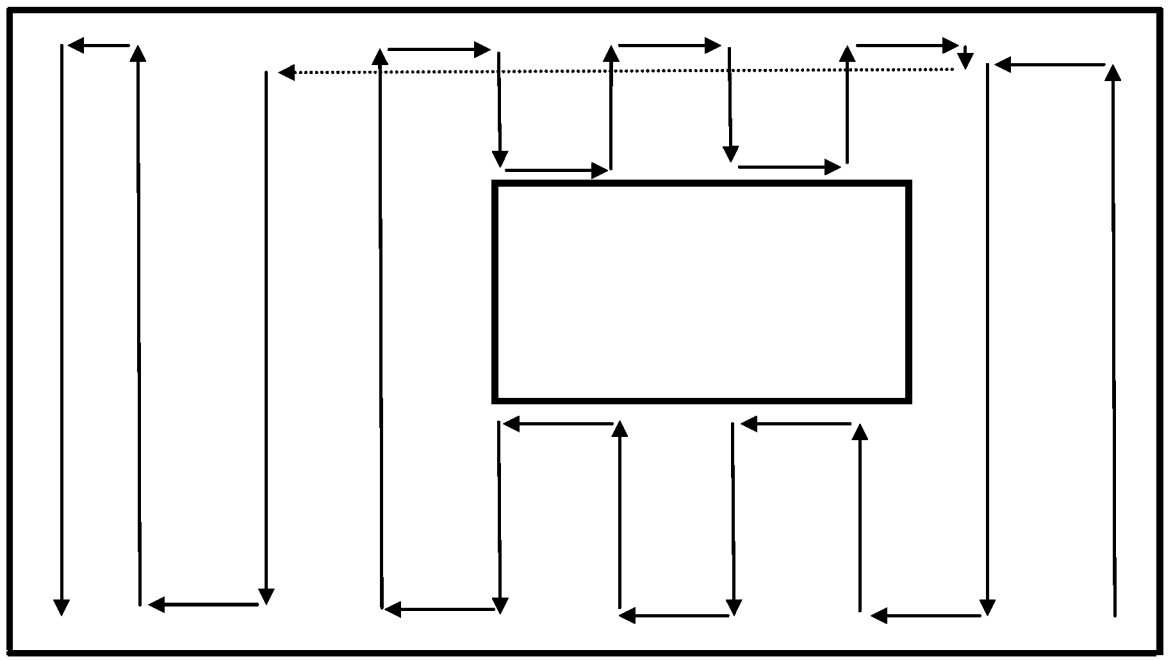
FIG. 7a shows a schematic example of the path the floor cleaner of FIGS. 1 to 5 will take in use across a room containing a centrally-located obstacle, the room shown in plan view.

The description above is for a cleaning process where the room is empty. If the room contains an obstacle of some kind, such as for example a table, desk or bed in the centre of the room, the process is outlined below. In a similar manner as for the description above, the relative directional or positional information should be read as if viewing the room in plan view, with all directional information for the robot relative to the room (e.g. the robot turns to the left or right in the room, not the robot's left or right). An operator transports the floor cleaner 1 to the room, with entry of the cleaner 1 into the room recorded via communication/transmission between RFID tags in the room, and the RFID reader in the floor cleaner 1, in the same or similar manner to that outlined above (box 100). Also as above, the operator locates the floor cleaner 1 at the lower-right-hand corner of the room, and the processor 20 than instructs the floor cleaner 1 to move forward, the floor cleaner 1 moving forward parallel to the right-hand wall (box 101). At the far end of the room, the floor cleaner 1 turns and moves until it faces back towards the lower edge or wall along a path next to the initial or first-created track, with the cleaning path the floor cleaner 1 creates on this 'return' path overlapping with the initially created path in the same or similar manner to that outlined above (box 102). If the return track is the same length as the previous track, the decision path goes from box 202, to 203, to 201 and back to 102, so on reaching the lower wall, at a point directly adjacent to the start point, the robot will turn in place to the left and start upwards on a track parallel to the tracks already created, and overlapping with the track to it's immediate right. In the same manner as described above, the floor cleaner 1 continues moving in this manner to create a series of parallel overlapping clean paths or strips until it encounters an obstacle. If the obstacle is in the approximate centre of the room (for example an operating table or other centrally located table or other item), the floor cleaner 1 will encounter either the lower edge or the upper edge on either an upwards path or a downwards path. The sensors 16 will indicate that there is an obstacle, and the processor 20 will instruct the floor cleaner 1 to slow down and then stop in a position as close to the obstacle as possible, while still being able to carry out a zero-point turn. The processor 20 will know that the floor cleaner 1 has encountered an obstacle, as the processor 20 continuously monitors and receives feedback from elements such as for example the drive motors 16, and is therefore able to assess distances and times for the parallel cleaning paths, and will therefore know that the current track or strip is shorter than the previous parallel track or strip (decision box 202). In the example shown in FIG. 7a, the path that the cleaning robot is on will be shorter than the previous path, on the lower side of the table or other central obstacle. The processor instructs the cleaning robot 1 to make turns to create parallel clean strips in the same direction—to the left—G before (box 103), along the lower side of the obstacle (the paths shown along the lower edge in FIG. 7a). The processor 20 is able to assess the 'length' of the obstacle based on how many of the shorter paths it creates before it clears the obstacle and is able to once again create a path as long as the initial path. Once the processor 20 has assessed that the track it is currently on or has just completed is longer than it's previous track (box 204—path longer? Y/N), it knows that it has cleared the left-hand side of the obstacle. It will then turn to move to the right on reaching the upper edge or wall (box 105), rather than to move to the left, and move so as to create a series of shorter clean strips on the far side of the obstacle (the upper side as shown in FIG. 7a). Once processor 20 judges that the floor cleaner 1 has created a sufficient number of these shorter strips so that the last strip it created overlaps with a longer, previously created strip to the right of the obstacle (at the end of each strip, as it makes a turn, the processor queries whether it has moved back far enough to overlap a previously created strip, or to reach the right-hand wall—decision box 205), then the floor cleaner 1 will turn around and move left along the top wall (box 106), in parallel with the top wall, until it can turn anti-clockwise and create a strip in parallel with, to the left of, and overlapping with, the previously-created long strip to the left of the obstacle—the arrow from box 106 to box 102 indicating where the robot moves to the left along the dotted path and resumes where it left off previously to back-track along the top of the obstacle, turning to create an overlapping track to the left of and in the opposite direction to the previous long track. The path taken by the robot to move back to this position is shown by the dotted line in FIG. 7a, and for clarity is shown slightly below the shorter horizontal lines which indicate the path taken by the cleaning robot 1 to track across the room between the longer parallel clean strips. However, it should be noted that in actual use the cleaning robot 1 will move along the wall directly adjacent to the wall). The floor cleaner 1 will then continue to operate as previously outlined for an obstacle-free room until it reaches the left-hand wall, at which point it will clean until it is located in the lower-left corner, when it will transmit information relating to the cleaning process in a similar manner to that outlined above, and then deactivate.

Figure 7B:
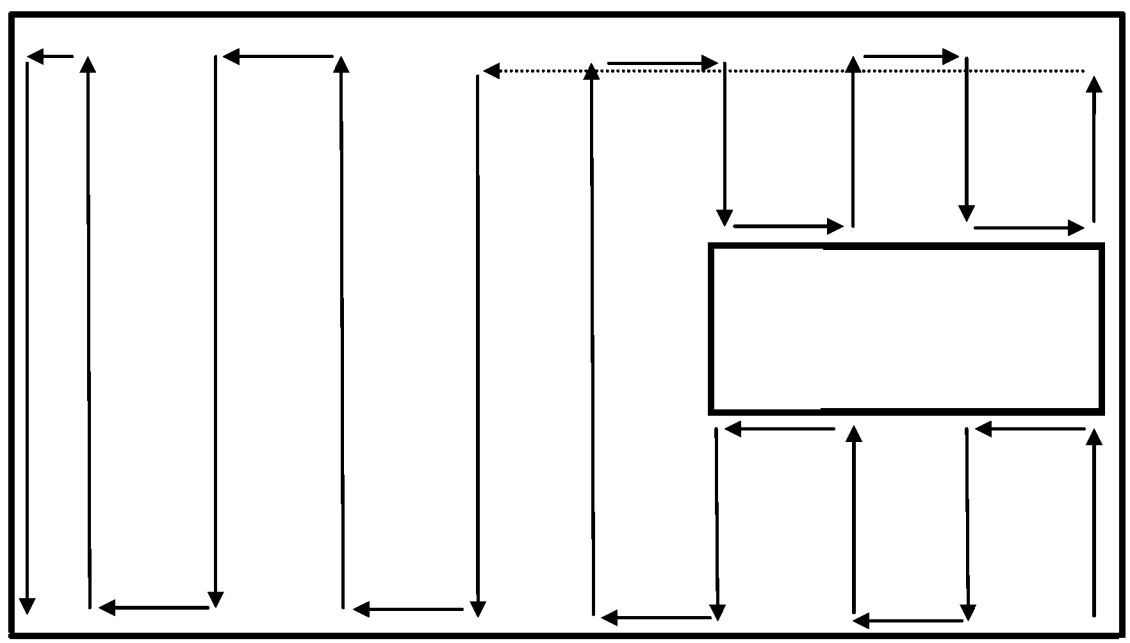
FIG. 7b shows a schematic example of the path the floor cleaner of FIGS. 1 to 5 will take in use across a room containing an obstacle located at the side of the room, the room shown in plan view.
Figure 8:
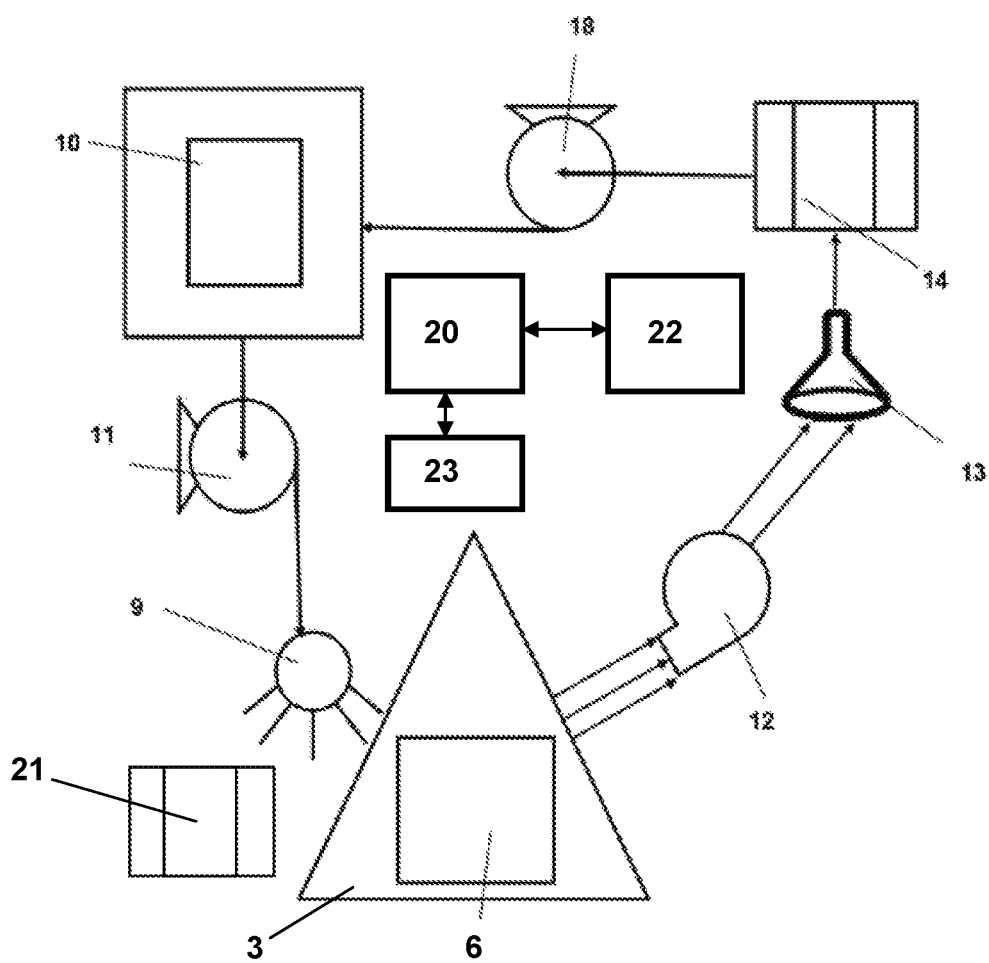
FIG. 8 shows a schematic overview of the architecture of a control system suitable for use as part of the embodiment of floor cleaner of FIGS. 1 to 5, the main elements that form the floor cleaner and which are located within the casing shown in a similar manner to that of FIG. 3, this figure also showing a UV lamp that is mounted so as to assist with sterilisation as part of the cleaning process, and a central processor, RFID reader, and wireless receiver/transmitter also shown, the RFID reader and wireless receiver/transmitter in communication with the central processor, the central processor directly connected to some or all of the main elements so as to send commands and to receive feedback and data.

If the obstacle is located at one edge of the room, as shown in FIG. 7b, the floor cleaner 1 will move backwards and forwards (up and down in plan view) so as to create a series of short cleaned strips each of the same length, as shown in FIG. 7b, following the steps of boxes 100, 101 and 102 (read RFIDs, move until the far wall is reached, turn around and position for return strip in parallel to and overlapping with previous strip, to the left of previous strip. Once the floor cleaner 1 is clear of the obstacle (to the left of the obstacle as shown in FIG. 7b), the processor 20 will recognise that it is creating a longer strip ('N' from decision box 202—not shorter, and 'Y' from box 203—strip is longer), and will know from this that it is clear of the obstacle. At the end of this longer strip, on reaching the top edge, the floor cleaner 1 will turn to the right (box 105), so as to commence the creation of a series of short strips along the top of the obstacle. The processor can assess that the floor cleaner 1 has reached the right-hand wall by interrogating the data received from e.g. the sensors, motors, etc at the end of each strip (has the RH-wall or a previously-cleaned section been reached: Y/N—box 205. If 'N', it will continue to move to the right (box 105) until it does reach the wall, and the output answer in box 205 is 'Y'). At this point, it will orient so as to be able to move along the top edge to the left, and then, on reaching a position where the processor 20 assesses that the cleaning robot is at the left-hand edge of the previously-created long strip to the left of the obstacle, will orient so that it can move towards the lower edge wall and move to commence the creation of a strip in parallel with, to the left of, and overlapping with, the previously-created long strip to the left of the obstacle—boxes 106 to 102. As before, this path is shown by the dotted line in FIG. 7b, and for clarity is shown slightly below the shorter horizontal lines which indicate the path taken by the cleaning robot 1 to track across the room between the longer parallel clean strips. As before, it should be noted that in actual use the cleaning robot 1 will move along the wall directly adjacent to the wall. The floor cleaner 1 will then continue to operate as previously outlined for an obstacle-free room until it reaches the left-hand wall, at which point it will clean until it is located in the lower-left corner, when it will transmit information relating to the cleaning process in a similar manner to that outlined above, and then deactivate. Similarly, for an obstacle at the left-hand side of the room against the left-hand wall, or for obstacles in the corner(s), the processor 20 will recognise when it is creating longer or shorter strips than it has on previous runs, and will then subsequently recognise that it is either clear of an obstacle (by creating a subsequent longer run) and that it therefore needs to return to cover the opposite side of the obstacle, or that it has reached the far (left-hand) wall without creating a longer run, but that it's last strip was shorter than it's initial strip(s), which indicates that there is an obstacle in the lower-left corner of the room, and that it should transmit data and deactivate.

The invention claimed is:

1. An automated floor cleaner, comprising:
a cleaner body;
an endless belt, connected to and extending from the cleaner body so that in use a section of a surface area of the belt is in contact with a floor;
a motor, connected to the belt to drive the belt independently of movement of the cleaner body across the floor;
at least one drive wheel and at least one drive motor connected to the cleaner body and configured to move the cleaner body across the floor;
a memory module configured to map and record the position of the cleaner body during use;
at least one short range sensor configured to sense the proximity of a front of the cleaner body relative to an obstacle and to transmit data relating to the proximity to the memory module.

2. The automated floor cleaner as claimed in claim 1 wherein the belt comprises a plurality of bristles that extend outwards from a main body of the belt.

3. The automated floor cleaner as claimed in claim 2 wherein the bristles are spaced across a width of the belt.

4. The automated floor cleaner as claimed in claim 3 wherein the bristles are substantially regularly spaced across the width of the belt in rows, a number of bristles in each row are substantially between 50 and 60.

5. The automated floor cleaner as claimed in claim 4 wherein the rows are formed in groups of six rows with a discrete gap between each group.

6. The automated floor cleaner as claimed in claim 4 wherein the rows in each group are spaced substantially 10 mm apart.

7. The automated floor cleaner as claimed in claim 5 wherein the discrete gap between each group is substantially 15 mm.

8. The automated floor cleaner as claimed in claim 2 wherein each bristle is substantially circular in cross-section with a diameter of substantially 2 mm.

9. The automated floor cleaner as claimed in claim 8 wherein substantially an outer half of each bristle is angled rearward at an angle.

10. The automated floor cleaner as claimed in claim 9 wherein the angle is substantially 45 degrees.

11. The automated floor cleaner as claimed in claim 1 wherein the belt has a width substantially between 250 mm and 450 mm.

12. The automated floor cleaner as claimed in claim 1 wherein a main body of the belt has a thickness of substantially between 5 mm and 12 mm.

13. The automated floor cleaner as claimed in claim 1 wherein the belt is arranged to in use extend from the cleaner body so that the section of the surface area of the belt in contact with the floor comprises substantially between ⅓ and ½ of a total outer surface area of the belt.

14. The automated floor cleaner as claimed in claim 1 further comprising at least two rollers, the rollers and belt arranged so that the belt passes over the rollers and is held in tension.

15. The automated floor cleaner as claimed in claim 14 wherein the rollers are arranged so that the belt passes over the rollers so as to have substantially parallel upper and lower sides, the lower sides forming the section of the surface area of the belt in contact with the floor, the upper sides substantially equivalently sized to the lower sides.

16. The automated floor cleaner as claimed in claim 1 further comprising three rollers, the rollers and belt arranged so that the belt passes over the rollers and is held in tension, the rollers arranged so that the belt passes over the rollers in a triangular pattern.

17. The automated floor cleaner as claimed in claim 16 wherein the triangular pattern is a substantially equilateral triangle.

18. The automated floor cleaner as claimed in claim 1 further comprising at least one fluid jet connected to the cleaner body and configured to direct a spray of fluid onto a raised external surface of the belt.

19. The automated floor cleaner as claimed in claim 18 wherein the at least one fluid jet is arranged so that the fluid therefrom will be directed onto the raised external surface of the belt just prior to that section of the surface area of the belt moving into contact with the floor.

20. The automated floor cleaner as claimed in claim 18 further comprising a tank configured to hold a volume of fluid and a pump, the tank and the at least one fluid jet fluidically connected, the pump configured to drive a flow of fluid from the tank to the at least one fluid jet.

* * * * *